No. 676,110. Patented June 11, 1901.
J. W. WILSON.
SWING SEAT FOR VEHICLES.
(Application filed June 10, 1899.)
(No Model.)
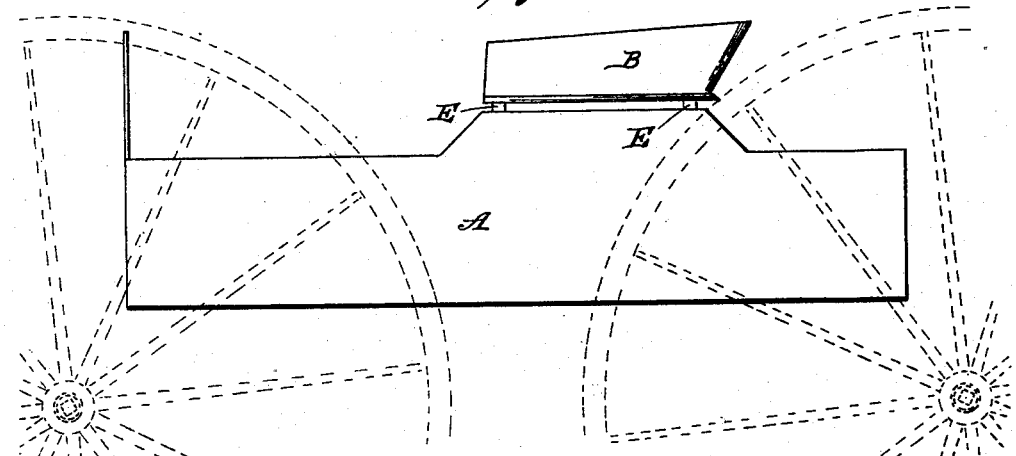
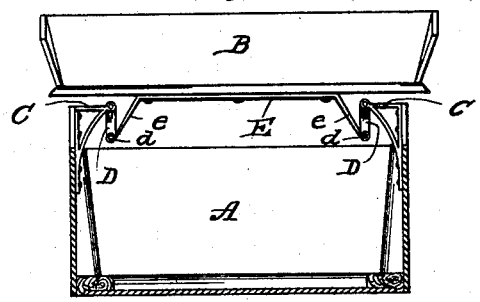
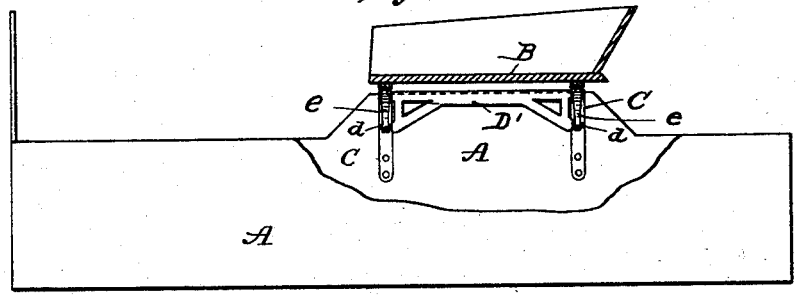
Witnesses
Inventor

UNITED STATES PATENT OFFICE.

JOHN W. WILSON, OF MANCHESTER, NEW HAMPSHIRE.

SWING-SEAT FOR VEHICLES.

SPECIFICATION forming part of Letters Patent No. 676,110, dated June 11, 1901.

Application filed June 10, 1899. Serial No. 720,002. (No model.)

*To all whom it may concern:*

Be it known that I, JOHN W. WILSON, a citizen of the United States, residing at Manchester, in the county of Hillsboro and State of New Hampshire, have invented certain new and useful Improvements in Swing-Seats for Vehicles; and I do hereby declare the following to be a full, clear, and exact description of the invention, such as will enable others skilled in the art to which it appertains to make and use the same.

This invention relates more especially to seats for vehicles which are themselves mounted on springs—such, for instance, as light buggies and carriages of every description.

The object of the invention is to relieve occupants upon the seats of such vehicles of the lateral jerks which a person is invariably subjected to when driving in a carriage over rough roads or pavements.

The invention consists, essentially, in a laterally-movable seat for light vehicles—i. e., a seat which will move up or down, forward or backward, identically with the body of a vehicle as if it were rigidly attached thereto, but which will move independently of said body in a lateral direction. This I accomplish by pivotally connecting a seat to a vehicle by means of links or rockers, so that it may automatically move sidewise with any sudden jar occasioned by the sluing of said vehicle or by reason of its passing over a generally rough road, as will be fully set forth in the following specification and claim and clearly illustrated in the drawings accompanying and forming a part of the same, of which—

Figure 1 is a side elevation of the body of an ordinary piano-box buggy to which my improved seat is applied. Fig. 2 is a cross-section of the same. Fig. 3 is a transverse sectional view of the seat.

A represents the body of a vehicle, and B is my improved seat, which is loosely attached to the body A.

A simple manner of carrying my invention into effect without using too much of the space underneath the seat is to attach brackets C (two on a side) to the inner side of each side of said body adjacent to the seat B, as shown in Fig. 2. These brackets carry depending arms or rockers D, one end of which is pivotally attached to a bracket, the opposite or lower end of said rockers being pivotally attached near either end of the under portion of the seat B to suitable brackets or supports, which may be formed as shown in Fig. 2, consisting of longitudinal bars E, attached one near the front and one near the back of the under portion of a seat, said bars having their ends bent downward preferably at an angle, as at *e e*, the lower end of each rocker D being pivotally attached, as at *d*, to either bent end *e* of the longitudinal bars E. The only advantage in running the bars E lengthwise or longitudinally of the seat instead of crosswise is that strength and durability favor the former. For the same reason the rockers may be made in form of a frame, as at D' in Fig. 3, extending from the front to the back bars E.

Having described my improvements, what I claim is—

The combination with a vehicle body and seat, angular brackets secured to the sides of the body and links pivoted at their upper end *s*, of rigid flat bars secured to the under side of the seat near the front and rear edges thereof, the ends of said bars being deflected downwardly at obtuse angles and a pivotal connection between the ends of said bars and said links, substantially as described.

In testimony whereof I affix my signature in presence of two witnesses.

JOHN W. WILSON.

Witnesses:
J. B. THURSTON,
EMILE H. TARDIVEL.